United States Patent
Ishii et al.

[15] 3,653,923
[45] Apr. 4, 1972

[54] SWEETENING COMPOSITION

[72] Inventors: Kiyofumi Ishii, Ikeda; Jun Toda, Suita; Hisashi Aoki, Suita; Hideo Wakabayashi, Suita, all of Japan

[73] Assignee: Takeda Chemical Industries, Ltd., Higashi-ku, Osaka, Japan

[22] Filed: Feb. 27, 1969

[21] Appl. No.: 803,089

[30] Foreign Application Priority Data

Mar. 20, 1968 Japan....................................43/18137

[52] U.S. Cl. ............................................................99/141 A
[51] Int. Cl. ............................................................A23l 1/26
[58] Field of Search.............................99/141 A, 28, 78, 141

[56] References Cited

UNITED STATES PATENTS 3,087,821  4/1963  Horowitz et al. ........................99/141

*Primary Examiner*—Raymond N. Jones
*Assistant Examiner*—Roger B. Andewelt
*Attorney*—Wenderoth, Lind & Ponack

[57] ABSTRACT

A remarkable synergistic action in sweetening effect is exhibited between neohesperidin dihydrochalcone and a saccharin sweetener by employing both in a ratio of from about 0.1:1 to about 3:1.

8 Claims, No Drawings

SWEETENING COMPOSITION

This invention relates to novel sweetening compositions, more particularly, to sweetening compositions which exhibit a strong sweetening effect by the synergistic action between both components, i.e., a saccharin sweetener and neohesperidin dihydrochalcone.

There are many kinds of sweetening agents such as sucrose, sodium cyclohexylsulfamate, sorbitol or saccharin. On the other hand, some kinds of chalcones and dihydrochalcones are known to show sweet taste (see pp. 545 to 571 of "Biochemistry of Phenolic Compounds" published in 1964 by Academic Press, London and New York), and these compounds show no toxicity to mammals.

It has been found by the present inventors that a remarkable synergistic action in sweetening effect is exhibited between a saccharin sweetener and neohesperidin dihydrochalcone by employing both in a specified ratio.

As far as the present inventors have tested synergistic action is not observed in other combinations of known sweetening agents and chalcones or dihydrochalcones e.g., between sucrose and neohesperidin dihydrochalcone, between sodium cyclohexysulfamate and neohesperidin dihydrochalcone, between saccharin and naringin dihydrochalcone, between saccharin and hesperetin 7-$\beta$-D-glucoside dihydrochalcone, between sucrose and naringin dihydrochalcone, between sodium cyclohexylsulfamate and naringin dihydrochalcone, between sodium cyclohexylsulfamate and hesperetin 7-$\beta$-D-glucoside dihydrochalcone, between sucrose and hesperetin 7-$\beta$-D-glucoside dihydrochalcone, between sorbitol and neohesperidin dihydrochalcone, etc.

Thus, the synergistic action in sweetening effect between a saccharin sweetener and neohesperidin dihydrochalcone is very specific to this combination among combinations between sweetening agents and chalcones or dihydrochalcones.

It is a principal object of the present invention to provide novel non-toxic synergistic sweetening compositions comprising neohesperidin dihydrochalcone and a saccharin sweetener.

Another object of the present invention is to provide a method for synergistically sweetening food products by the employment of neohesperidin dihydrochalcone together with a saccharin sweetener, as well as the food products sweetened thereby.

As the saccharin sweetener, one of the active ingredients of the present sweetening compositions, there may be employed saccharin itself or its physiologically acceptable salt such as ammonium salt, an alkali metal salt (e.g., sodium salt, potassium salt) and an alkaline earth metal salt (e.g., calcium salt, magnesium salt). That is, the term "saccharin sweetener" throughout the specification and claims of the present application is meant to refer to one or more of saccharin itself and its physiologically acceptable salts. The amount in connection with the ratio and concentration of "saccharin sweeter" is expressed in terms of saccharin sodium ($C_7H_4O_3NSNa \cdot 2H_2O$) throughout the specification and claims of the present application.

The characteristic and remarkable synergistic action between a saccharin sweetener and neohesperidin dihydrochalcone in sweetening effect upon which the present invention is based is confirmed, for example, by the following Test:

TEST

The relative sweetness ratings of Samples A, B and C were analyzed according to H. Scheffe's Analysis Method of Variance for Paired Comparisons described in "Journal of the American Statistical Association" Vol.47, pp.381 to 400 (1952) with employment of a panel consisting of 18 members who have each the ability for an extra judgement of sweetness. The results are summarized in Table 1.

TABLE 1

| Mark | Sample Solvent | Saccharin Sodium (% w/v) | Neohesperidin dihydrochalcone (% w/v) | Main effect** |
|---|---|---|---|---|
| A | distilled water | | 0.005 | −0.633 |
| B | do | 0.01 | | 0.022 |
| C | do | 0.005 | 0.0025 | 0.611 |

**: Significant at 1% level.

As clearly seen from Table 1, Sample C comprising both neohesperidin dihydrochalcone in a half amount of the same contained as the sole active ingredient in Sample A and saccharin sodium in a half amount of the same contained as the sole active ingredient in Sample B shows a stronger sweetness than that of Sample A and that of Sample B, which clearly means that a synergistic action in sweetening effect is exhibited between neohesperidin dihydrochalcone and saccharin sodium.

As stated, such a synergistic action in sweetening effect is not observed in other combinations of sweetening agents and chalcones or dihydrochalcones.

The sweetening composition of the present invention may be prepared by homogeneously admixing a saccharin sweetener with neohesperidin dihydrochalcone. The advantageous ratio of neohesperidin dihydrochalcone to the saccharin sweetener is from about 0.1:1 to about 3:1 by weight. When neohesperidin dihydrochalcone is mixed with a saccharin sweetener in a ratio outside the range above-mentioned, there is not exhibited an eminent synergistic action but a tendency to a mere additive action. Most advantageous ratio of neohesperidin dihydrochalcone to the saccharin sweetener is from about 0.3:1 to about 3:1.

Incorporation of neohesperidin dihydrochalcone into a saccharin sweetener according to the present invention may be effected by simple and thorough admixture. The admixed materials may further be admixed with one or more additional ingredients. These are exemplified by other sweetening agents such as sodium cyclohexylsulfamate, sucrose or sorbitol, diluents such as carboxymethyl-cellulose, glucose, lactose or dextrin, and the like. The admixed materials can be in powdery or crystalline from, or in the liquid phase, as e.g., in solution in a suitable solvent (water, alcohol, etc.).

The resultant powdery, crystalline or granular admixture may be put to use as such, or it may be further coated with a coating agent suitable for practical use.

The sweetening compositions thus-prepared, constituting a further aspect of the invention, are applicable to all kinds of foods to which conventional sweetening agents are applicable. Typical illustrative examples of such foods are processed fruits or vegetables such as juice, nectar, canned spinach; meat products such as bacon, sausage, ham; milk products such as condensed milk, cheese, chocolate dairy drinks; egg products such as nogs, custards; bakery products such as breads, crackers, cakes; ice creams, sherbets and ices; salad dressings; pickles and relishes; beverages such as carbonated soft drinks, fruit ades, wines, coffee drinks; cooked foods such as soups, stews; and dietary-type foods.

In using the sweetening compositions of the present invention, they are incorporated in the foods to be sweetened in the amount sufficient to attain the desired level of sweetness. Ordinarily, because of their intense sweetness, the sweetening compositions are employed in a relatively low concentration, as served, of about 0.05 percent or less, usually less than about 0.03 percent. However, when concentrations of both the main ingredients of the present sweetening compositions, i.e., neohesperidin dihydrochalcone and a saccharin sweetener are extremely low, the eminent synergistic action in sweetening effect is not attained. It gives best results to incorporate the sweetening compositions in foods so as to make the concentration of neohesperidin dihydrochalcone and a saccharin sweetener at least about 0.0002 percent and at least about 0.0005 percent, respectively, relative to the total weight of the foods as served.

It is also within the scope of the present invention to incorporate severally a saccharin sweetener and neohesperidin dihydrochalcone in foods to be sweetened, i.e., without admixing them beforehand provided that the ratio between the saccharin sweetener and neohesperidin dihydrochalcone and the concentration thereof are not deviated from the aforesaid range.

The foods thus-treated with the sweetening compositions of the present invention show a mild, dilicious and lasting sweetness.

In the following Examples percentages are by weight, parts by volume bear the same relationship to parts by weight as do milliliters to grams.

EXAMPLE 1

2.5 parts by weight of neohesperidin dihydrochalcone and 7.5 parts by weight of saccharin sodium are homogeneously mingled to give 10 parts by weight of powdery sweetening composition.

This composition shows a delicious sweetness which is about 400 times as strong as that of sucrose.

EXAMPLE 2

25 parts by weight of neohesperidin dihydrochalcone, 25 parts by weight of saccharin sodium and 50 parts by weight of sodium cyclohexylsulfamate are homogeneously mingled. The mixture is kneaded with water, granulated, dried and sieved to give a granular sweetening composition.

This composition has a high ability to deliciously sweeten, for example, orange drinks when added thereto in the range of from about 0.04 to about 0.06 percent.

EXAMPLE 3

20 parts by weight of neohesperidin dihydrochalcone, 20 parts by weight of saccharin calcium and 1,000 parts by weight of lactose are homogeneously mingled to give a powdery sweetening composition.

This composition shows a delicious sweetness which is about 20 times as strong as that of sucrose.

EXAMPLE 4

10 parts by weight of neohesperidin dihydrochalcone, 10 parts by weight of saccharin sodium and 1,000 parts by weight of lactose are homogeneously mingled to give a powdery sweetening composition.

One cup of coffee (120 ml.) wherein 1 gram of this composition is added shows the same sweetness as that of a cup of coffee wherein 10 grams of sucrose is added.

EXAMPLE 5

200 parts by weight of wheat flour, 6 parts by weight of baking powder, 1 part by weight of table salt, 50 parts by weight of butter, 1 part by weight of the sweetening composition which is prepared in Example 3, 50 parts by weight of egg, and 200 parts by volume of cow's milk are homogeneously admixed. The mixture is baked at about 190° C. for about 15 minutes to give a well-sweetened muffin.

Having thus disclosed the invention, what is claimed is:

1. A sweetening composition comprising neohesperidin dihydrochalcone and a saccharin sweetener in ratio by weight of from about 0.1:1 to about 3:1.

2. A sweetening composition as claimed in claim 1, which comprises both neohesperidin dihydrochalcone and a saccharin sweetener in a ratio by weight of from about 0.3:1 to about 3:1.

3. A sweetening composition as claimed in claim 1, wherein the saccharin sweetener is saccharin sodium.

4. A sweetening composition as claimed in claim 1, wherein the saccharin sweetener is saccharin calcium.

5. A food product in combination with the sweetener according to claim 1, wherein the quantity of neohesperidin dihydrochalcone is at least about 0.0002 percent and the quantity of the saccharin sweetener is at least about 0.0005 percent relative to the weight of the food as served.

6. A food product as claimed in claim 5, wherein the weight ratio of neohesperidin dihydrochalcone relative to the saccharin sweetener is from about 0.3:1 to about 3:1.

7. A food product as claimed in claim 5, wherein the saccharin sweetener is saccharin sodium.

8. A food product as claimed in claim 5, wherein the saccharin sweetener is saccharin calcium.

* * * * *